US009267624B2

(12) United States Patent
Railsback et al.

(10) Patent No.: US 9,267,624 B2
(45) Date of Patent: Feb. 23, 2016

(54) CONDUIT BRACKETRY, SYSTEMS AND METHODS

(71) Applicant: THE GATES CORPORATION, Denver, CO (US)

(72) Inventors: Layne Railsback, Brighton, CO (US); Walker Bolger, Denver, CO (US); Donald R. Gilbreath, Castle Rock, CO (US); Jeffrey David Payne, Denver, CO (US)

(73) Assignee: Gates Corporation, Denver, CO (US)

( * ) Notice: Subject to any disclaimer, the term of this patent is extended or adjusted under 35 U.S.C. 154(b) by 0 days.

(21) Appl. No.: 14/257,686

(22) Filed: Apr. 21, 2014

(65) Prior Publication Data

US 2014/0224942 A1    Aug. 14, 2014

Related U.S. Application Data

(62) Division of application No. 12/322,690, filed on Feb. 4, 2009, now Pat. No. 8,702,044.

(51) Int. Cl.

| F16B 12/26 | (2006.01) |
| F16L 3/227 | (2006.01) |
| F16L 3/223 | (2006.01) |
| F16L 3/237 | (2006.01) |
| F16B 7/04  | (2006.01) |

(52) U.S. Cl.
CPC ............... *F16L 3/227* (2013.01); *F16L 3/2235* (2013.01); *F16L 3/237* (2013.01); *F16B 7/04* (2013.01); *F16B 12/26* (2013.01)

(58) Field of Classification Search
USPC ............ 248/220.21, 220.22, 222.11, 223.41, 248/224.41, 224.8, 222.41, 229.2, 229.22, 248/229.24, 73, 65; 24/459, 335, 339, 341
See application file for complete search history.

(56) References Cited

U.S. PATENT DOCUMENTS

| 2,651,710 A | * | 9/1953 | Clark ..................... F21L 4/00 |
| | | | 312/107 |
| 3,403,641 A | * | 10/1968 | Baker .......................... 108/152 |
| 3,526,934 A | | 9/1970 | Owen, Sr. |

(Continued)

FOREIGN PATENT DOCUMENTS

| DE | 8801062 | 7/1989 |
| DE | 3824197 A1 | 1/1990 |

(Continued)

*Primary Examiner* — Alfred J Wujciak
(74) *Attorney, Agent, or Firm* — Paul N. Dunlap, Esq.; Jeffrey A. Thurnau, Esq.

(57) ABSTRACT

A bracket stores and separates conduits. The bracket includes two interchangeable halves having an engagement extrusion extending from an inner face. Each half has a corresponding receptive slot disposed in the inner face. The bracket half includes at least one conduit receptive channel defined in the inner face. The halves align and engage when each half's extrusion is inserted into the other half's slot. The channels align to secure a conduit therein. The engagement portions define a dovetail and socket engagement. At least two stages of securement may be provided. Securement may comprise snap fit, sliding or other methods. A first, temporary stage of engagement initially joins the halves, adjustably and releasably retaining the halves and the conduits together. The second and subsequent stages of engagement are tighter engagements between the tail and socket, achieved by applying more pressing force to the halves or inserting a fastener.

23 Claims, 3 Drawing Sheets

(56) References Cited

U.S. PATENT DOCUMENTS

| | | | |
|---|---|---|---|
| 3,756,637 A * | 9/1973 | Wildi | 439/819 |
| 4,199,070 A * | 4/1980 | Magnussen, Jr. | 211/60.1 |
| 4,460,141 A * | 7/1984 | Svensson | 248/222.13 |
| 4,819,309 A * | 4/1989 | Behymer | 24/586.11 |
| 4,953,146 A * | 8/1990 | McMurry | 367/191 |
| 5,058,843 A * | 10/1991 | Koster | 248/223.41 |
| 5,794,897 A * | 8/1998 | Jobin et al. | 248/74.4 |
| 5,941,483 A | 8/1999 | Baginski | |
| 6,079,673 A | 6/2000 | Cox | |
| 6,357,194 B1 * | 3/2002 | Jones, Jr. | 52/590.1 |
| 6,783,101 B2 | 8/2004 | Knotts | |
| 7,007,900 B2 | 3/2006 | Goodwin et al. | |
| 7,484,698 B2 | 2/2009 | Budagher | |
| 8,342,474 B2 * | 1/2013 | Gilbreath | 248/558 |
| 8,500,078 B2 * | 8/2013 | Castellanos | 248/339 |

FOREIGN PATENT DOCUMENTS

| | | |
|---|---|---|
| DE | 102005025360 | 12/2006 |
| FR | 2386759 | 11/1978 |
| JP | 56966 | 1/1981 |

* cited by examiner

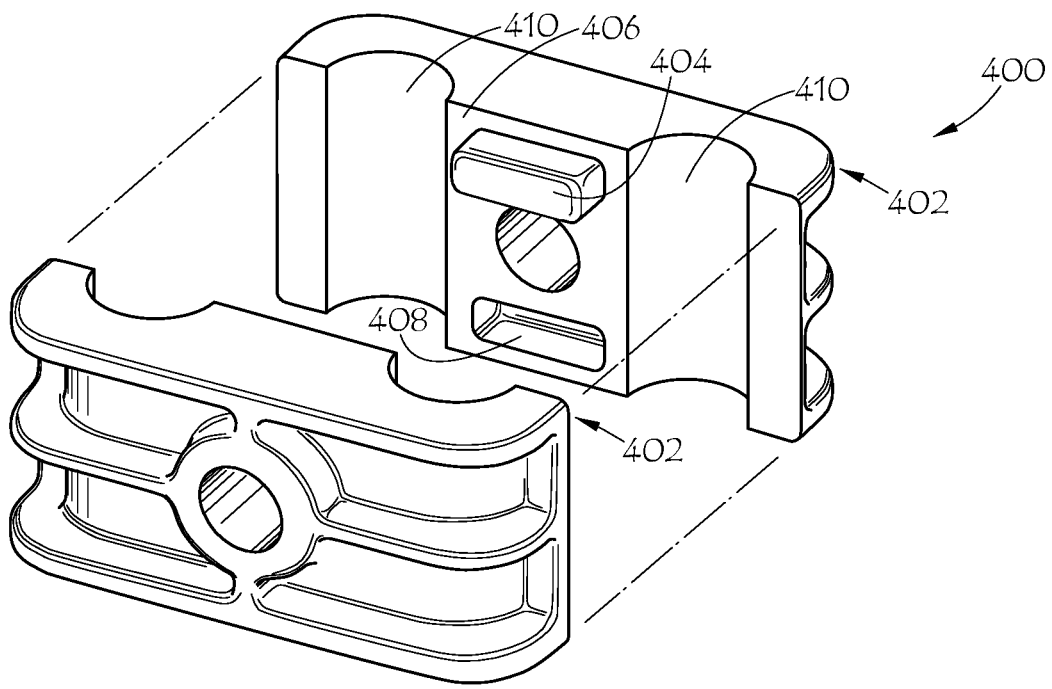
FIG. 4
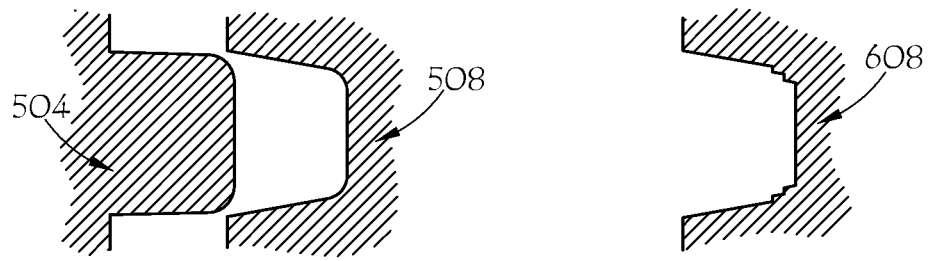
FIG. 5
FIG. 6

CONDUIT BRACKETRY, SYSTEMS AND METHODS

BACKGROUND OF THE INVENTION

1. Field of the Invention

This invention relates generally to a support system for elongated objects that may be primarily cylindrical in shape such as fluid conduits, more particularly to a bracket that receives and holds in place a conduit or bundle of conduits, and specifically to a bracket of generally symmetrical interchangeable halves comprising engagement portions that may mate multiple stages of securement to receive and securely store the conduits.

2. Description of the Prior Art

Bracketry for fluid conduits such as pneumatic or hydraulic pipe, tube, and hose, are known. Very often, systems of brackets or clamps are used to provide routing for fluid power circuits that have both pressure and return conduit lines. These conduit lines are typically routed between a pressure source, such as a pump, and a work load, such as a hydraulic cylinder. Mobile equipment often uses conduit lines constructed of hose, metal tubing, or a combination of both hose and metal tubing. Hose is most often used when a flexible connection between two unconnected mounting points is required.

Typically, this type of mobile equipment utilizes brackets or clamps to mount the conduit lines to equipment to provide the aforementioned routing. These clamps may contain mounting surfaces that correspond to and grip an outside diameter of the conduit with varying degrees of interference fit. The clamps are typically fastened to the conduit by molding methods, bolts, or other methods.

Usually, these clamps comprise hangers that are of a one-piece construction and provide little to no securement of the conduit unless an additional fastener is used to tighten the hanger around the conduit. One example of a hanger for conduits can be found in U.S. Pat. No. 5,593,115, to Lewis. Lewis appears to attempt to provide a hangar having spaced boreholes for receiving screws or bolts that attach pipe-supporting clamps to the hangar. A disadvantage of Lewis '115, and many other currently available conduit supports, is that each support clamp or hangar typically does not provide standalone support for a conduit or conduit bundle.

SUMMARY

The present invention is directed to systems and methods which provide secure, reliable support for fluid conduits. Routing designs of conduit and equipment may be complicated; the present invention provides a functional and adaptable way to support conduits and mount them to equipment. An example of a support system that exhibits superior organization of conduits can be seen in embodiments of the present invention. The present conduit bracketry system comprises a system of bracketry wherein a snap-fit method of attaching the bracket to the fluid conduits might provide multiple stages of securement of the conduits. The multiple stages of securement allow the conduits to be temporarily or permanently held in place, facilitating the maintenance and replacement of conduits while in use or during transport.

While other modular shapes of the bracket are contemplated, various embodiments of the present invention employ brackets of a generally parallelepiped shape. Embodiments of the present bracketry systems and methods comprise assembly of two generally symmetrical halves. The halves are preferably interchangeable and mate with one another to support at least one fluid conduit, typically two or more conduits. Thus, the halves may comprise two conduit channels and, when the halves are engaged with one another, these conduit channels align to receive conduits therein. Furthermore, in accordance with expected embodiments, the channels are generally semi-cylindrical in nature, however the channels may comprise any cross section, to support objects of varying cross sections and in certain embodiments may have elliptical, oblong, or oval-shaped cross sections, which may facilitate the retaining of a conduit during assembly. Preferably, various embodiments of the present bracket can accommodate correspondingly varying sizes and types of conduits, from those used in heavy machinery to conduits used in medical equipment, sporting gear, and other equipment.

The bracket halves each preferably comprise engagement portions that mate with one another to form a solid, secure, whole bracket. Each half preferably has an engagement extrusion and an engagement extrusion receptive slot, disposed on an inner surface of each half. Various embodiments of the present invention may provide halves having various sizes, shapes, and locations of engagement portions that may provide multiple stage securement via snap-fit securement methods, or the like.

In various embodiments of the present invention, the halves are of a generally rectangular shape, having six sides and a width that is greater than its thickness and height dimensions. The dimensions and shape of the halves can vary depending upon the intended use of the assembly. For example, conduits contained therein that are of a sturdier or larger nature may require a greater thickness dimension.

An advantage of the present invention is that the brackets can be mounted to the fluid conductors at the supplier plant and can bundle together multiple conduits in a modular fashion for easy shipment and installation at the user's location. The brackets may bundle the conduits together and may slip along the length of the conduits such that the brackets may be aligned with appropriate mounting locations during installation. The brackets maintain the positions of the conduits contained therein with respect to one another. The brackets are adjustable. The brackets can be mounted to the equipment in a temporary yet secure fashion, then the conduits can be adjusted, and the bracket and conduit assembly secured by simply tightening a fastener, which may be used to secure the bracket and conduits retained therein to equipment in a secure, fixed fashion such that movement of the conduits relative to the equipment and each other is arrested. Another advantage of the present invention is that the bracket halves can be placed around the conduit(s) before final installation of the conduits on the equipment, and can be removed to provide access to the conduit for maintenance without having to disassemble the conduit from the rest of the conduit bundle or from the bracket itself. Similarly, one half of a bracket may be used to retain and hold conduits in a spaced relationship for initial placement, then the second bracket half can be snap fitted to the first half, then a fastener passed through the mounting orifice to secure the bracket and conduits.

Thus, various embodiments of a bracket of the present invention might include two generally symmetrical halves, with each half defining an engagement extrusion extending from a face of the half, an engagement extrusion receptive slot defined in the face and disposed generally parallel to, and spaced apart from, the extrusion and at least one conduit receptive channel defined in the face. Preferably, the halves are interchangeable and the extrusion on each of the halves mates with the slot in each of the halves to secure the halves together with each of the channels aligned to secure a conduit therein. The halves are preferably molded from a resilient material, such as from a polymer, and each of the halves define a mounting hole, the mounting holes aligning following mating of the halves.

Thus, in accordance with the present invention a complete bracket assembly might include a first bracket half defining: at least one first conduit receptive channel defined in a face of the first bracket half; a first engagement extrusion extending from the face of the first bracket half; a first engagement extrusion receptive slot defined in the face of the first bracket half, disposed generally parallel to, and spaced apart from the first extrusion; and at least one first mounting hole. A second bracket half preferably, correspondingly defines: at least one second conduit receptive channel defined in a face of the second bracket half, generally aligned with the first conduit receptive channel securing a conduit therein; a second engagement extrusion extending from the face of the second bracket half, snap fittingly received by the first engagement extrusion slot; a second engagement extrusion receptive slot defined in the face of the second bracket half, disposed generally parallel to, and spaced apart from the second extrusion, snap fittingly receiving the first engagement extrusion; and at least one second mounting hole, generally aligned with the first mounting hole.

The receptive slots may mate with the extrusions in (at least) two stages of securement. The two stages of securement might include a first stage of securement wherein the receptive slot temporarily engages the extrusion in a snug, yet removable manner. To provide this first stage of securement the slot might include a first step that engages the extrusion during the first stage of securement. The slot might also further include a second step within the slot. In the second stage of securement the receptive slot fully engages the extrusion.

The extrusion may slide in the slot to engage and disengage the halves. Thus, the engagement extrusion may run the length of the face and the slot may correspondingly run the length of the face. The extrusion on each of the halves may snap-fit with the slot in each of the halves to secure the halves. The engagement extrusion may take the form of a tail, and the slot, a socket, with the tail and socket forming a dovetail and socket engagement. Alternatively, the extrusion on each of the halves may snap-fit with the slot in each of the halves to secure the halves together with each of the channels aligned to secure a conduit therein. The extrusion on each of the halves might take the form of a protrusion that snap-fits with a pocket that defines the slot in each of the halves.

Hence, a method for securing one or more conduits might include disposing a conduit in a channel defined in the face of a first conduit bracket half and aligning a second conduit bracket half with the first conduit bracket half. This alignment might be accomplished by fitting a second channel defined in a face of the second conduit bracket half over a part of the conduit not disposed in the first channel, then aligning an engagement extrusion portion extending from the face of the first conduit bracket half with an engagement extrusion receptive slot defined in the face of the second conduit bracket half and aligning an engagement extrusion portion extending from the face of the second conduit bracket half with an engagement extrusion receptive slot defined in the face of the first conduit bracket half. As a result, a mounting hole defined in the first conduit bracket half is preferably aligned with a mounting hole defined in the first conduit bracket half. Then, the engagement extrusion portion extending from the face of the first conduit bracket half is engaged with the engagement extrusion receptive slot defined in the face of the second conduit bracket half and the engagement extrusion portion extending from the face of the second conduit bracket half is engaged with the engagement extrusion receptive slot defined in the face of the first conduit bracket half to a first stage of securement. This engagement might be accomplished by pressing the engagement extrusion portion extending from the face of the first conduit bracket half into the engagement extrusion receptive slot defined in the face of the second conduit bracket half and pressing the engagement extrusion portion extending from the face of the second conduit bracket half into the engagement extrusion receptive slot defined in the face of the first conduit bracket half. Alternatively, the engagement might be accomplished by sliding one of the conduit bracket halves relative to the other of the conduit bracket halves to engage the engagement extrusion portion extending from the face of the first conduit bracket half with the engagement extrusion receptive slot defined in the face of the second conduit bracket half and to engage the engagement extrusion portion extending from the face of the second conduit bracket half with the engagement extrusion receptive slot defined in the face of the first conduit bracket half. Regardless, a fastener is preferably secured through the aligned mounting holes to engage the engagement extrusion portion extending from the face of the first conduit bracket half with the engagement extrusion receptive slot defined in the face of the second conduit bracket half and to engage the engagement extrusion portion extending from the face of the second conduit bracket half with the engagement extrusion receptive slot defined in the face of the first conduit bracket half to a second more secure stage of securement.

Thus, one method for securing conduit(s) might call for disposing each conduit in a channel defined in the face of a first conduit bracket half and snap fitting a second conduit bracket half to the first conduit bracket half. This snap fitting might be accomplished by aligning the second conduit bracket half with the first conduit bracket half by fitting a second channel defined in a face of the second conduit bracket half over a part of the conduit not disposed in the first channel. Then the conduit bracket halves may be pressed together by pressing an engagement extrusion portion extending from the face of the first conduit bracket half into an engagement extrusion receptive slot defined in the face of the second conduit bracket half, and pressing an engagement extrusion portion extending from the face of the second conduit bracket half into an engagement extrusion receptive slot defined in the face of the first conduit bracket half. This may provide the aforementioned first stage of securement. Also, a mounting hole defined in the first conduit bracket half is preferably aligned with a mounting hole defined in the first conduit bracket half as a result. Thereafter, the mated conduit bracket halves, and the conduit(s) disposed therein, may be secured to a structure using a fastener passing through the mounting holes. This may provide the aforementioned second stage of securement.

Preferably, following subsequent removal of the fastener, one of the conduit bracket halves may be slid, relative to the other of the conduit bracket halves, to disengage the halves, such that each of the engagement extrusion portions slide in the respective engagement extrusion slot. Thereupon, the conduit(s) may be removed from the bracket halves.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings:

FIG. 4 is an environmental perspective view of yet another embodiment a conduit bracket system of the present invention;

FIG. 5 is an enlarged fragmented side view of an embodiments of an engagement protrusion and engagement protrusion receptive pocket; and FIG. 6 is an enlarged fragmented side view of another embodiment of an engagement protrusion receptive pocket.

DETAILED DESCRIPTION

Figure 1:
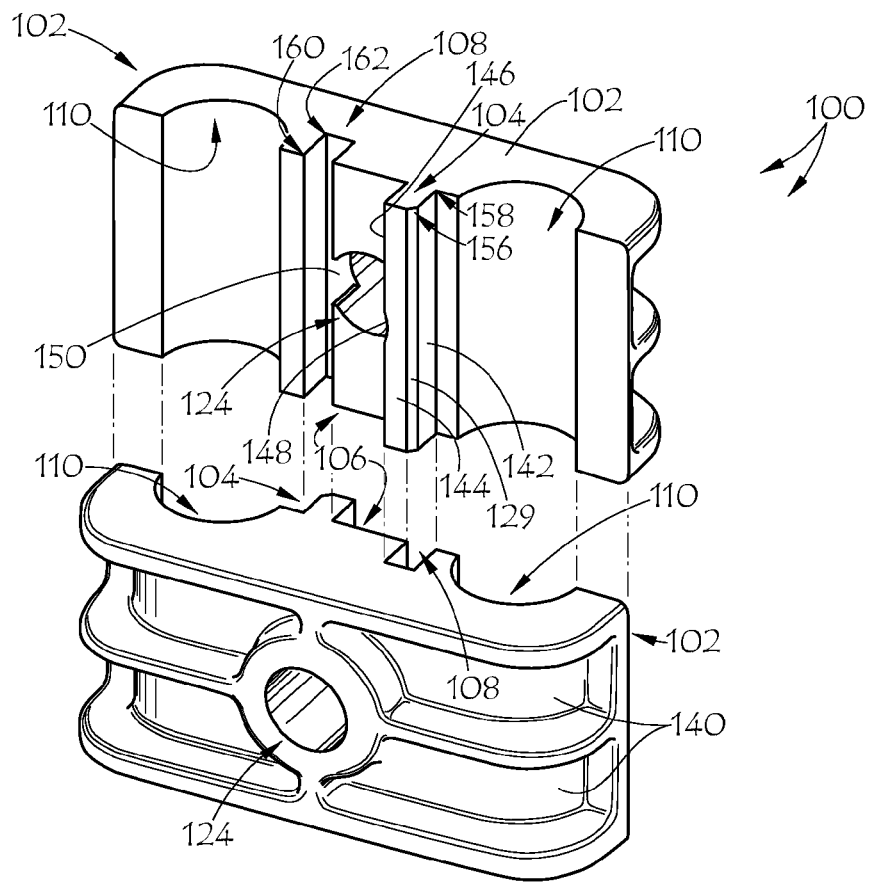
FIG. 1 is an environmental perspective view of an embodiment of the present conduit bracket system.
Figure 1A:
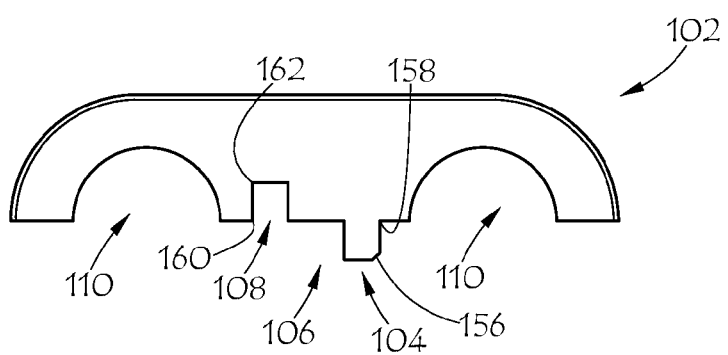
FIG. 1A is a top plan view of a bracket half.

FIGS. 1 and 1A show an embodiment of the present invention, comprising conduit bracket system 100 adapted to store or retain fluid conduits or similar elongated objects, wherein the bracket system can be assembled by sliding or snap-fit methods. In various embodiments of the present invention, the elongated objects may comprise the aforementioned fluid conduits, including pipe, tubing, hose or other conduits. In FIG. 1, bracket system 100 comprises two halves 102. Halves 102 are generally symmetrical and mate with one another to form bracket 100. Halves 102 may be interchangeable with one another, which might facilitate installation of bracket 100 and/or conduits retained therein, while also facilitating accessibility to the conduits contained therein for repair or similar purposes, as well as replacement of halves 102 themselves. Additionally, the symmetry of the halves 102 may allow the use of a single mold to form both halves, which might result in lower manufacturing costs compared to those of other conduit brackets. In the illustrated embodiments, halves 102 each comprise two conduit channels 110. The ends of conduit channels 110 may be chamfered. When the two halves 102 are engaged, the conduit channels 110 of each half 102 align to secure a conduit therein. In various embodiments the joined channels may not be "truly" round. Rather, the joined channels may have a minor axis that is less than the diameter of the conduit to be retained. This minor axis may be across the channel(s) such that a channel may initially hold a conduit until the other half of the bracket is fitted to the half holding the conduit. Alternatively, or additionally the minor axis may lie across the two joined channels, such that the conduit is more securely held once the bracket haves are finally joined, such as during the second stage of securement discussed in greater detail below. Although the illustrated brackets are shown having two channels, embodiments of conduit brackets embodying the present invention can receive, support, and transport a varying number of conduits in one bracket by providing any number of channels. A benefit of various embodiments of the present invention is the ability of one bracket 100 to bundle together not only similar conduits, but different families of conduits having different performance functions, such as those found in fluid power circuits. For example, one set of channels in a two-conduit bracket embodiment might retain a relatively high pressure line, which might take the form of a metal tube, and the other set of channels retain a relatively low pressure fluid return line, which might take the form of a hose or plastic tube. Such fluid conduit arrangements might be found in a power steering circuit or any number of other hydraulic circuits having a pressure line and a return line.

Again with attention directed to the embodiment shown in FIG. 1, halves 102 each comprise an engagement extrusion 104 and an engagement extrusion receptive slot 108. The engagement extrusion 104 and receptive slot 108 are disposed on face 106 of the respective half. In the illustrated embodiments, extrusion 104 extends outwardly from face 106 and is spaced apart from receptive slot 108. The extrusion 104 and slot 108 may be disposed generally parallel to channels 110, as illustrated and on either side of mounting hole 124.

Face 106 is shown as comprising a generally smooth inner surface of half 102. Although the inner surfaces of slot 108, half 102, and channel 110 are shown as generally smooth, interruptions to the smoothness of these parts as well as to any portion of the various embodiments of the bracket of the present invention is contemplated. For example, protrusions in the form of ridges, bumps, ribs, knurling or the like may outcrop from the surfaces, including the surface of conduit channels so as to add friction between the conduit and the channels. Depending upon the flexibility and function of the enclosed conduit, and the material from which it and the bracket is manufactured, such frictional increases may be appropriate in certain applications. Conversely, surfaces of the bracket may be interrupted by depressions, such as ridges or divots, to decrease frictional wear or decrease the weight of the overall bracket. As but one example, surface depressions 140, shown in FIG. 1, reduce the overall weight of half 102 and reduce the amount of material necessary to form the bracket. Surface depressions 140 may be altered in shape and depth, or removed, depending upon the application of the bracket 100. Additionally, the ribs and other raised portions defining depressions 140 may act to strengthen and or stiffen the bracket. Further, these ribs, raised portions, and depressions 140 may help to prevent or control sinking, warping, or shrinkage of the material comprising the halves following molding, helping to insure overall dimensional integrity of the halves.

In a first stage of securement, the symmetrical engagement portions of each half 102 meet and engage. The engagement extrusion 104 is aligned with, or placed into, the corresponding engagement extrusion receptive slot 108. The extrusion 104 may be placed into slot 108 in any number of manners. The extrusion 104 may snap into the slot 108 or the extrusion 104 may be placed into the receptive slot 108 by sliding. In embodiments of the present invention, when the halves 102 initially meet, they may do so in a "snap" or "interference fit" or "press fit" fashion. This initial engagement of the halves 102 can be referred to as the "first stage of securement". At this time, the two halves 102 are in secure enough engagement with one another to ensure secure retention of the bracket together with conduits disposed in channels 110. Engagement, even though potentially temporary, of the halves 102 around the conduits allows for the placement and separation of conduits before the conduits are clamped to equipment.

A second stage of securement can then be achieved. The second stage of securement can be achieved by pressing the two halves 102 together with additional force. This may achieve a press-fit or snap-fit closure, and in accordance with various embodiments of the present invention, the second stage of securement is preferably obtained by tightening a fastener, such as a bolt or screw, disposed through mounting holes 124 of engaged bracket halves 102. The tightening down of the fastener (for example, a bolt being tightened to a fixture to which the bracket is to be secured) will achieve subsequent degrees of securement and engagement of the mated extrusions and slots.

Thus, the two halves 102 can be assembled around the conduits, before the conduits are placed, whereupon the halves will retain relative position of the conduits and their positions on the conduits, with or without the use of an additional fastener, while the conduits and bracket are properly positioned and finally secured, using the fastener. This initial securement and final securement feature results in excellent reliability for installation, retrofit, field replacement, and repair of the conduits and the brackets.

As noted above, in various embodiments of the present invention, halves 102 may comprise mounting holes 124. Mounting holes 124 may run through a central region of half 102, in a generally perpendicular fashion to channel 110. When halves 102 mate, the mounting holes 124 in each half 102 align to receive the fastener (not shown), as discussed above. As initially discussed above, the fastener may provide a reliable, final stage of securement. Preferably the halves 102 retain a relatively secure engagement once they have been mated in which movement of the bracket along the conduit(s) may, to at least some degree, still be afforded. The halves 102 become more intimately engaged with the installation of the fastener. In the initial stage of securement, the fastener may be partially inserted into the mounting hole 124 to keep the halves 102 from sliding relative to one another, and positioning of the bracket. The fastener, such as a bolt, can then be tightened down, such as to a threaded equipment fixture. Alternatively, a temporary fastener such as a pin can be used to ensure that relative movement of one half 102 to another is generally arrested and/or that relative movement between the bracket and the conduit may be is at least somewhat arrested. Subsequently, the temporary fastener may be replaced by a bolt or other similar fastener. A temporary fastener may comprise a rod, expansion pin, bolt, or other such securing device. A pin fastener may include a ridge that may engage with a recess within mounting hole 124 to hold the pin in place. Alternatively, a ridge defined along the bore of mounting hole 124 may hold a bolt or similar fastener in place, such as during initial deployment of the fastener. A pin or fastener retained in one of these manners may help to hold the bracket halves together on the conduits during shipment and during the initial stages of installation. Thereafter, the bolt can secure the bracket to a piece of equipment or other structure.

Mounting hole 124 may comprise any size to accept fasteners of standard and non-standard sizes. Mounting hole 124 may or may not be threaded to accept and engage threaded fasteners; therefore, fasteners for non-threaded holes, such as those that expand to fill or draw up behind a metal plate, may also be used. Should a bolt or threaded stud be used as the primary fastening mechanism, a washer and nut may also be employed. The bolt may comprise any type of bolt, such as a hex head, carriage, flange, shoulder, T-head, or cap screw and may pass through bracket 100 to secure the assembly to an attached structure. In certain embodiments, the present invention may further comprise a hex recess to accommodate a nut. In various embodiments the use of a fastener is optional, potentially lowering the cost of manufacturing relative to other conduit supports. The bracket 100 may comprise any number of mounting holes 124, should additional support be needed. An additional fastener may be beneficial when a large number of conduits are to be attached to machinery or when heavier conduits are retained by the bracket.

Reviewing FIG. 1 in more detail, extrusion 104 may comprise an extrusion exterior surface 142. Extrusion 104 may further comprise extrusion front surface 144. Front surface 144 and extrusion exterior surface 142 may define chamfer 129. The size, angle, and shape of chamfer 129 may vary to accommodate different applications of the bracket 100. For example, thicker extrusions 104 may be used in heavier duty applications of bracket 100. Therefore, a need for a smooth-cornered or bigger chamfer may arise. The length of extrusion 104 can vary, although by running along most, if not the entire height of face 106, the length of extrusion 104 might add to the stability of engagement between engaged halves 102. Chamfer 129 may aid in the insertion of extrusion 104 into slot 108, particularly when the halves are pressed together for a snap-fit type engagement, rather than slid together. The depth of extrusion 104 is generally defined by extrusion interior surface 146 and extrusion exterior surface 142. The depth of slot 108 into face 106 can vary. In the illustrated embodiments, the depth of slot 108 is dictated by the depth of extrusion 104.

In various embodiments of the present invention, the width of a distal face 156 of extrusion 104 may exceed the width of root 158 of extrusion 104. Congruently, the width of slot 108 at its mouth 160 may be less than the width of the slot 108 at its back 162. This may facilitate snap-fit joinder between the extrusion 104 and slot 108. Therefore, facilitated by chamfer 129, the extrusion 104 easily engages mouth 160 and enters slot 108, by either sliding or snap together manners. Upon further compression of the two halves 102, the extrusion 104 is then pushed further in towards back 162 of slot 108, effecting the multi-staged nature of the engagement between extrusion 104 and slot 108, and thusly the securement of the two halves 102.

Extrusion 104 may also comprise extrusion inner surface 146 Inner surface 146 may include extrusion cutout 148. In some embodiments of the present invention, extrusion 104 is placed near mounting hole 124 so that extrusion 104 can assist in the grasping of a fastener running through mounting hole 124. Extrusion cutout 148 may comprise an arc-shaped cutout receptive to the dimension of mounting hole 124 and fastener. Similarly, face 106 may include a face cutout 150, through which the fastener protrudes from mounting hole 124 into slot 108.

Any number of materials may be used in the construction of a bracket in accordance with the present invention. The bracket halves may each comprise a contiguous piece of material or may include various materials for various portions. Preferably, each half is molded as one continuous piece of relatively resilient material, through molding methods such as injection molding, solid phase forming, or the like. When a relatively resilient material is used in the construction of the bracket, the difference between the width of the mouth 160 of the slot 108 and width of the distal end 156 of the extrusion 104 may be of an amount such that when mated, the extrusion 104 and slot 108 engage in a snap-fit manner. Conversely, when a more rigid material is used in the construction of the halves 102, the dimensions of the width of the mouth 160 of slot 108 and the width of distal end 156 of extrusion 104 may be more closely matched. Furthermore, whilst some embodiments of the bracket 100 may comprise halves 102 of a rigid or semi-rigid material, it may be beneficial to use material of a softer, more pliable, or lighter nature in construction of one or both halves 102. Various materials may be used in the construction of each half 102 to aid in noise reduction, vibration dampening, energy dissipation, thermal insulation, or other desirable functions. Hydraulic hoses tend to elongate and contract during pressurization cycles, so it would be beneficial to use material in bracket construction that would not hinder fluid flow within the hose. The halves may therefore be constructed of material such that the halves expand or contract with the expansion or contraction of the hose. Another manner to effect noise reduction within a fluid conduit system in accordance with the present invention might be to provide wider, stackable brackets made of a dampening material. Depending upon the location and/or application of the fluid conduit system being supported by bracket 100, it may be desirable to neutralize or conduct electrical fields that result from fluid flow through the conduit. The material used in the construction of the bracket 100 can therefore comprise polymer, composite, metal, ceramic, metal infused material, nano-materials, or any other material. As but one example unreinforced nylon 66 has proven to be a material which provides useful characteristics in the present bracket, such as acceptable snap-fit force and unsnap force characteristics, lateral conduit-pull-to-fail force, and washer/bolt torque limits needed to achieve the second stage securement, as well as acceptable thermal cycling characteristics. Preferably, bracket halves 102 mate with bracket halves 102 of the same construction. Conversely, however, the bracket halves 102 of the present invention can mate with bracket halves 102 of a different material composition. This may be useful when one bracket half attaches to a piece of equipment, hanger or conduit support system.

Figure 2:
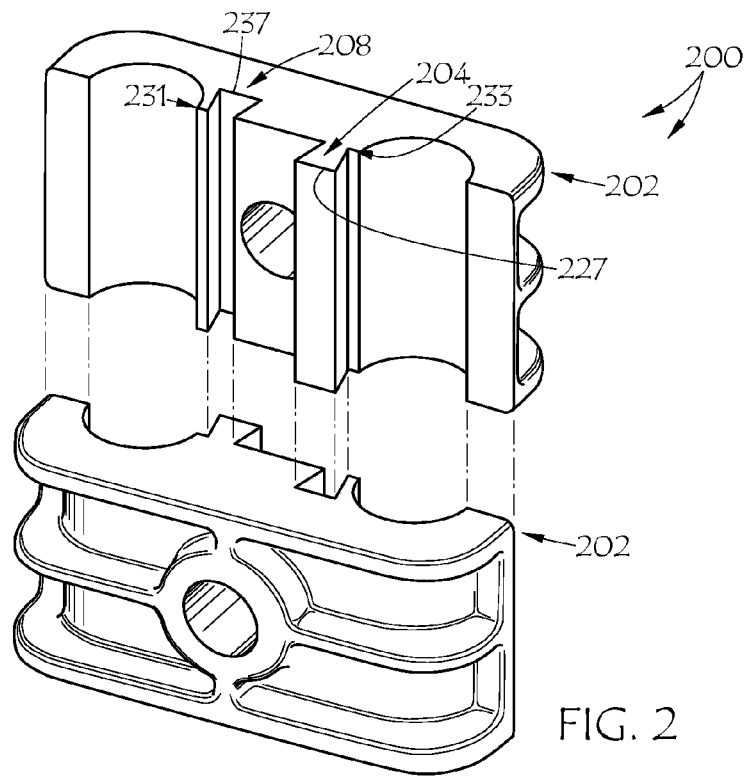
FIG. 2 is an environmental perspective view of another embodiment of a conduit bracket system of the present invention.
Figure 3:
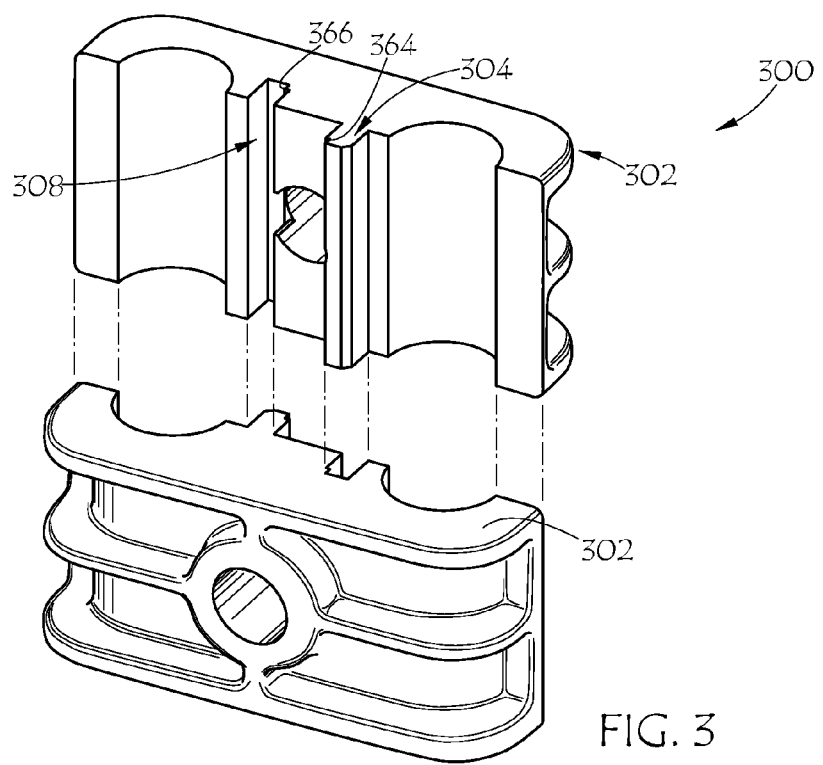
FIG. 3 is an environmental perspective view of still another embodiment of a conduit bracket system of the present invention.

As shown in FIGS. 1, 2 and 3, in various embodiments of the present brackets 100, 200 and 300, extrusions 104, 204, 304 and slots 108, 208 and 308 may take a number of different forms. It should be understood that the term "extrusion" and "engagement extrusion" as used herein and in the claims refers to the elongated nature of the protruding engagement tabs in the case of extrusions 104, 204, 304, and not to the process used to form them. The means by which the two halves may be engaged may comprise any form of joinder, including common woodworking joints such as traditional dovetail joints, sliding boxtail joints, spline, dado, scarf, rabbet, continuous finger joints, and other joints. Other joints besides channel and elongated tab fasteners or joints, including teeth fasteners or joints, or other forms of joints may be used. It should be understood that the dimensions, configuration, cross-section, and location of the engagement portions can vary, depending upon the application of the present invention. For example, although illustrated embodiments include engagement portions that may also engage fasteners, it may be beneficial to provide additional joints on the outer edges of the halves. For example, a rabbet joint may be employed instead or in addition to the illustrated configuration of the engagement extrusions and slots. This may aid in the stabilization of heavier, larger, or longer conduits.

FIG. 2 shows another embodiment of the present invention. In FIG. 2 bracket halves 202 define dove tail shaped extrusion 204, and groove-shaped slot 208. The width of the socket mouth portion 231 exceeds that of the socket back portion 237. The corresponding width of the tail distal end 227 exceeds that of the tail root 233. When the tail 204 and socket 208 are engaged, a tight securement is achieved. Although any dimension of the socket back portion 237 relative to the tail distal end 227 can be used, a tail distal end 227 width that is greater than the width of the socket back portion 237 is preferred to effect a tight snap-fit between the mating halves 202. The resulting engagement may facilitate both sliding and snap methods of engagement. For example, the first stage of engagement may occur by sliding two halves 202 together, mating but not locking the tail and groove. Alternatively, the two halves may be joined together by pressing the halves together for snap-fit joinder of the tails and grooves. Following either type of initial engagement, a further pressing force may be applied to the outer surfaces of halves 202, such as through the use of a bolt deployed through mounting holes 224 to secure the bracket in place and together. Then when a need arises to disassemble the bracket, the bolt may be removed and the bracket halves may be slid apart to allow removal of a conduit.

As can be seen in FIG. 3, in other embodiments of the present invention, such as illustrated bracket 300, extrusion 304 may include an extrusion step 364 to effect a snap-fit. Extrusion step 364 comprises a notch, or the like, running longitudinally along extrusion 304. The depth and cross-section of the extrusion step 364 can vary depending upon the application of the bracket. For example, in heavy duty applications, the depth of the step 364 may increase. Other cross sections may be contemplated as well, including a two-step notch. Correspondingly, slot 308 may provide a slot step 366, to accommodate the extrusion step 364. Slot step 366 may comprise a receptive notch of near-equal dimension to step 364, or slot 308 may provide a notch that is of a differing dimension to further effect a very secure engagement between the engagement portions. Such dimensions can vary depending upon the material used. Extrusion and slot steps 364 and 366 provide at least two stages of securement: the initial mating stage where the two halves 302 are snap-fitted together but not permanently connected and the steps initially mate; and a second stage where the two halves 302 are pressed together by the use of a tightened bolt, or in a similar manner, and the steps fully engage and interlock.

FIG. 4 is an illustration of still another embodiment of the present invention and shows an engagement protrusion 404 and engagement protrusion receptive pocket 408, wherein bracket system 400 can be assembled by snap-fit methods. Bracket halves 402 each have an engagement protrusion 404 and engagement protrusion receptive pocket 408. Protrusion 404 and pocket 408 are defined in face 406 of each half 402 and can be elongated to more-or less occupy the entire face between channels 410. It should be understood that protrusion 404 and pocket 408 can comprise any number of complementary shapes, dimensions, configurations, or locations on half 402.

FIG. 5 illustrates another embodiment of the present invention wherein pocket 508, generally corresponding to pocket 408 of FIG. 4, is of a smaller cross section than protrusion 504 (exaggerated for illustration purposes in FIG. 5), so that protrusion 504 and pocket 508 interengage in an interference-fit fashion. This ensures a snug snap-fit, to securely retain the bracket halves together during initial securement and tight interference fit in subsequent second stage securement. FIG. 6 shows a stepped surface of pocket 608 providing steps that when engaged with a corresponding protrusion, to provide various stages of securement (snap-fit or interference-fit) between pocket 608 and a protrusion.

Although the present invention and its advantages have been described in detail, it should be understood that various changes, substitutions and alterations can be made herein without departing from the scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A bracket for securing a conduit comprising:
    two generally symmetrical halves, each half comprising:
        an engagement extrusion extending from a face of said half and running along the entire height of said face;
        an engagement extrusion receptive slot defined in said face, running along the entire height of said face, and disposed generally parallel to, and spaced apart from, said engagement extrusion; and
        at least one conduit receptive channel defined in said face,
    wherein said engagement extrusion on each of said halves mates with said slot in each of said halves to secure said halves together with each of said channels aligned to secure the conduit therein,
    wherein said engagement extrusion on each of said halves snap-fits with said slot in each of said halves,
    wherein said halves are interchangeable, and
    wherein said engagement extrusion is a tail and said slot is a socket, and said tail and said socket form a dovetail and socket engagement;
    wherein said engagement extrusion snaps into said slot in a direction perpendicular to said face to engage said halves, and slides out of said slot in a direction parallel to said face to slidably disengage said halves.

2. The bracket of claim 1, wherein said engagement extrusion also slides into said slot in a direction parallel to said face to slidably engage said halves.

3. The bracket of claim 1, wherein said engagement extrusion slides into and out of said slot in a direction parallel to said face to slidably engage and disengage said halves.

4. The bracket of claim 1 wherein said halves are molded from a resilient material.

5. The bracket of claim 1, wherein said receptive slot mates with said engagement extrusion in at least two stages of securement.

6. The bracket of claim 5 wherein the at least two stages of securement includes a first stage of securement wherein the receptive slot temporarily engages the engagement extrusion in a snug yet removable manner.

7. The bracket of claim 6 wherein the slot further comprises a first step that engages said engagement extrusion during said first stage of securement.

8. The bracket of claim 7 wherein the slot further comprises a second step within said slot.

9. The bracket of claim 6 wherein the at least two stages of securement includes a second stage of securement wherein said receptive slot fully engages the engagement extrusion.

10. The bracket of claim 9, wherein said tail slides in said slot in a direction parallel to said face to disengage said halves.

11. The bracket of claim 1, where each of said halves defines a mounting hole, the mounting holes aligning following mating of said halves.

12. The bracket of claim 1, wherein said engagement extrusion on each of said halves snap-fits with said slot in each of said halves to secure said halves together with each of said channels aligned to secure a conduit therein.

13. A method of using the bracket of claim 1 for securing a conduit comprising:
    disposing the conduit in said at least one conduit receptive channel defined in the face of a first conduit bracket half of said two halves; and
    snap fitting a second conduit bracket half of said two halves to said first conduit bracket half, said snap fitting comprising:
        aligning said second conduit bracket half with said first conduit bracket half by fitting the conduit receptive channel defined in the face of said second conduit bracket half generally over the opposite side of the part of said conduit disposed in said channel in said first conduit bracket half; and
        pressing said two conduit bracket halves together to snap said halves together
            by pressing the engagement extrusion of said face of said first conduit bracket half into the engagement extrusion receptive slot of said second conduit bracket half and
            pressing the engagement extrusion of said face of said second conduit bracket half into the engagement extrusion receptive slot of said first conduit bracket half.

14. The method of claim 13, further comprising:
    aligning a mounting hole defined in said first conduit bracket half with a mounting hole defined in said second conduit bracket half.

15. The method of claim 14, further comprising:
    securing said conduit bracket halves and said conduit disposed therein to a structure using a fastener passing through said mounting holes.

16. The method of claim 13, further comprising:
    sliding one of said conduit bracket halves relative to the other of said conduit bracket halves to disengage said halves, such that each of said engagement extrusion portions slide in the respective engagement extrusion slot.

17. The method of claim 16, further comprising:
    removing said conduit from said bracket halves.

18. A method of using the bracket of claim 1 for securing a conduit comprising:
    disposing the conduit in said at least one conduit receptive channel of a first conduit bracket half of said two halves;
    aligning a second conduit bracket half of said two halves with said first conduit bracket half by:
        fitting said at least one conduit receptive channel of said second conduit bracket half over a part of said conduit not disposed in said first conduit bracket half;
        aligning the engagement extrusion of said first conduit bracket half with the engagement extrusion receptive slot of said second conduit bracket half;
        aligning the engagement extrusion of said second conduit bracket half with the engagement extrusion receptive slot of said first conduit bracket half; and aligning a mounting hole defined in said first conduit bracket half with a mounting hole defined in said second conduit bracket half;

slidably engaging each said engagement extrusion with its corresponding said engagement extrusion receptive slot to a first stage of securement; and securing a fastener through the aligned mounting holes to engage said engagement extrusions with said engagement extrusion receptive slots to a second more secure stage of securement.

19. The method of claim 18, further comprising:

snap fitting said second conduit bracket half to said first conduit bracket half by aligning said second conduit bracket half with said first conduit bracket half and pressing said halves together.

20. The method of claim 19, wherein said securing comprises securing said conduit bracket halves and said conduit disposed therein to a structure using said fastener passing through said mounting holes.

21. The method of claim 20, further comprising:

sliding one of said conduit bracket halves relative to the other of said conduit bracket halves in a direction parallel to said faces to disengage said halves, such that each of said engagement extrusion portions slide in the respective engagement extrusion slot.

22. The bracket of claim 1, wherein said two halves are generally identical.

23. The bracket of claim 1, wherein said extrusions slide in said slots in a direction parallel to said respective faces to engage and disengage said halves.

* * * * *